Patented Nov. 30, 1943

2,335,689

UNITED STATES PATENT OFFICE 2,335,689

WELL TREATING FLUID

Leo Clark Morgan, Eastborough, and Troy J. Stewart, Great Bend, Kans.; said Stewart assignor to said Morgan No Drawing. Application August 3, 1940, Serial No. 351,194

5 Claims. (Cl. 252—8.55)

This application is a continuation-in-part of our copending application Serial No. 220,701, filed July 22, 1938, now Patent No. 2,227,860 of January 7, 1941.

The present invention relates to the treatment of wells with acids for the purpose of increasing the production thereof, and has particular reference to an oil or gas well-treating fluid of improved properties.

As is well known in the acid treatment of oil wells for the purpose of increasing the production thereof, a solution of hydrochloric acid, which is usually commercial muriatic acid, is introduced into the well, and after the acid has eroded the adjacent acid soluble earth formation, the spent treating fluid is withdrawn. It has been found that muriatic acid of commerce customarily used in such acid treatment contains appreciable quantities of sulfuric acid and iron salts. These impurities in the acids introduced into the well, together with the soluble sulfates and iron salts acquired from the earth formation during acidizing or inadvertently introduced into acid during the process of handling the same, provide the necessary material for the formation of precipitates which have a tendency to clog the flow channels of the earth formation when the acid spends itself.

In the issued patent of one of us (Leo Clark Morgan), No. 2,128,161, there is disclosed novel well-treating fluid which obviates the disadvantages resulting from the precipitation of calcium sulfate and similar insoluble salts. Our copending application above indicated illustrates one method of preventing the precipitation of insoluble iron salts. According to the invention disclosed in said patent, a small proportion of a calcium sequestering agent is added to the acid to be used as the well-treating fluid, and such calcium sequestering agent holds the calcium in solution, thereby preventing the precipitation of insoluble calcium salts. The continuation-in-part which is above mentioned teaches the addition of a small proportion of a material which maintains the iron present in solution in the ferrous state.

In accordance with the present invention, we have found that certain organic materials behave as iron sequestering agents with respect to ferric iron, i. e., agents which tend to lock up or suppress the ferric iron ions and prevent the precipitation of insoluble ferric iron salts. We have found that certain of these materials function best when the majority of the iron present in the acid solution is in the ferric state. Ferrous iron will not, in general, form harmful precipitates, but ferrous iron is readily oxidizable to the ferric state, and consequently iron sequestering agents are useful in solutions which may contain only ferrous iron. A number of compounds are available which tend to exhibit this quality of inhibiting the precipitation of ferric iron and these are related to some of the oxidation inhibitors used in gasoline and to the developers of commercial photography. The iron sequestering agents of this invention include such compounds as the polyhydric phenols, and preferably those having three hydroxy groups in the molecule. However, the best commercial material which we have found with respect to cheapness, availability, and practical commercial application, is pyrogallic acid (sometimes referred to as pyrogallol), and to a lesser extent—catechol.

Since our previous application, Serial No. 220,701, filed July 22, 1938, illustrated most of the disadvantages of the presence of ferric iron in an acid-treating solution, it would be superfluous to further discuss the problem in this patent. However, for the sake of illustration, we shall discuss in a cumulative manner the properties of our improved well-treating fluid, with reference to this previously mentioned application and the previously mentioned patent.

It has been found that the iron present in the treating fluid during the period of use presents a problem which must be solved if maximum efficiency is to be had in preventing secondary precipitation in the well-treating fluid. The iron, which is contained in the solution during the period of acid treatment, will be present in the ferrous state or ferric, or both. These two forms of iron ions differ not only as to their valence charge (ferrous $Fe^{++}$, ferric $Fe^{+++}$) but also their chemical properties. In the manufacturing, transportation, and handling of hydrochloric acid, the acid is, at times, in contact with iron. The iron dissolves in the acid in accordance with the following ionic equation:

$$Fe \rightarrow Fe^{++} + 2(e) \qquad (1)$$

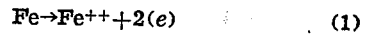

The ferrous ion, however, is rapidly oxidized to the ferric state, thereby imparting a yellow color to the acid solution, the ferrous solution being "water white":

$$Fe^{++} \rightarrow Fe^{+++} + (e) \qquad (2)$$

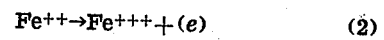

We have found that the presence of the ferric ion in the solution not only tends to form precipitates such as ferric hydroxide, which are insoluble in the spent acid solution, but reduces the efficiency of certain calcium sequestering agents (mentioned in previous patent application) which may be used to prevent the formation of insoluble calcium salts. Thus, for example, using sodium hexametaphosphate as a calcium sequestering agent, when this agent is added to the acid, the ferric ions in the said solution react with the metaphosphate ions to form $Fe_2P_6O_{18}$, which is only slightly soluble in neutral and weak acid solutions. The $Fe_2P_6O_{18}$ appears as a gelatinous precipitate and not only adds to the quantity of insoluble precipitate, but tends to prevent the sequesteration of calcium sulfate, inasmuch as the metaphosphate ion is effectively removed from solution. On the other hand, the ferrous ion reacts with the metaphosphate to produce ferrous metaphosphate $Fe_3P_6O_{18}$, which is soluble in neutral and acid solutions, and the metaphosphate is free to function as a calcium sequestering agent. In other words, when the acid solution contains a calcium sequestering agent, iron in the ferric state may react therewith and form precipitates which clog the pores of the earth formation, whereas iron in the ferrous state does not react to form a precipitate.

It was observed that when limestone was treated with a solution containing 15.0 per cent by weight of hydrochloric acid and also containing 0.49 gram of iron (ferric) per liter and 1.75 grams of sulfuric acid per liter, the addition of sodium hexametaphosphate to this acid solution prior to its reaction with the limestone failed to completely prevent the formation of a precipitate. If, however, the ferric iron is reduced to the ferrous state or the ferric iron is effectively sequestered by the addition of an iron sequestering agent of the present invention, before the addition of the sodium hexametaphosphate to the solution, the precipitate may be substantially completely prevented, and the spent solution has properties comparable to the properties resulting from the reaction of a solution of hydrochloric acid containing 15.0 per cent by weight chemically pure hydrochloric acid.

Now, in order to bring about the more efficient use of these ferric iron sequestering agents, it may be desirable to oxidize the greater part of the iron present in the acid solution, from the ferrous to the ferric state. This may be brought about by the addition of a small amount of sodium peroxide or hydrogen peroxide or any similar oxidizing agents such as sodium chlorate, sodium perchlorate, barium peroxide, and the like. These may be introduced in excess prior to the addition of the ferric iron sequestering agent. The acid solution thus prepared, when introduced into the well through the tubing or casing, will dissolve further iron or iron oxidation products such as scale from the metallic parts of the well before entering the formation to be treated, and the excess oxidizing agent will automatically oxidize the iron to the ferric state. If an excess of the ferric iron sequestering agent is present, the ferric iron will be immediately sequestered, locked-up, or suppressed, and thus be rendered inactive during any further reactions that the solution may undergo.

It may be that at times there is no necessity to add a calcium sequestering agent or material to prevent the coagulation of slime, etc., and in specific instances, it is desirable to prevent only the precipitation of the iron. In that case, two alternatives are available:

1. To add a reducing agent to the acid solution, such as stannous chloride, as tought by our co-pending application, Serial No. 220,701.

2. The addition of an iron sequestering agent with or without the previous addition of an oxidizing agent.

As an example of the preferred embodiment of the present invention, the sequestering of the ferric iron present in a well-treating fluid may be accomplished by adding a small amount of pyrogallic acid, which may or may not be preceded by the addition of a small amount of sodium peroxide or other oxidizing agent, to an acid solution consisting of 15.0 per cent muriatic acid and less than 1.0 per cent of a calcium sequestering agent, such as those disclosed in United States Patent No. 2,128,161, and claimed therein. For a more complete discussion of the calcium sequestering process, reference is made to the aforesaid issued patent, No. 2,128,161. However, by way of example of such calcium sequestering agents, mention may be made of compounds which contain or produce an acid solution of a molecularly dehydrated phosporic acid; a number of complex nitrogen and phosphorous compounds, and certain detergents which contain the oleyl radical; for example, that sold under the name of "Gardinol LS Flakes."

Preferably, however, we employ an alkali metal hexametaphosphate, such as the sodium salt. An acid solution containing 15.0 per cent hydrochloric acid to which is added less than 1.0 per cent pyrogallic acid and to which may be added, prior to the addition of the pyrogallic acid, less than 1.0 per cent of sodium peroxide, and to which is added less than 1.0 per cent sodium hexametaphosphate and less than 1.0 per cent of a mud peptizing agent, such as disclosed in United States Patent No. 2,128,160, of Leo Clark Morgan, including such materials as glue, starch and gelatin, constitute the preferred embodiment of the present invention. Under certain conditions it may be desirable to add a froth-depressing or anti-foaming agent which may comprise octyl alcohol or capryl alcohol.

The resulting acid solution when introduced into the bore hole may, by the quantities of the material used, exhibit a retarded rate of reaction and also prevent the formation of insoluble calcium and iron salts and the precipitation of mud within the bores of the earth formation.

From the foregoing detailed discussion, it will be apparent that many variations will be made without departing from the spirit and scope thereof. Thus, for example, as previously mentioned, an excess of reducing agent or sequestering agent may be used as desired to assure reduction of any iron which might be dissolved from the metal equipment or earth formation during treatment. We therefore intend to be restricted only in accordance with the following claims.

We claim:

1. In the treatment of a fluid producing well to increase the rate of production thereof, the step which comprises introducing into the well a treating fluid comprising an acid capable of forming water soluble salts with the earth formation, said acid containing less than 1.0 per cent of a polyhydroxy aromatic ferric iron sequestering agent, whereby to prevent the precipitation of the iron salts present in the solution when said acid has spent itself in the earth formation.

2. A well-treating fluid comprising an acid capable of forming water soluble salts with the earth formation, said acid containing less than 1.0 per cent of a polyhydroxy aromatic ferric iron sequestering agent.

3. The well-treating fluid of claim 2 wherein said iron sequestering agent consists of pyrogallic acid.

4. The well-treating fluid of claim 2 wherein said iron sequestering agent contains a small proportion of catechol.

5. The well-treating fluid of claim 2 wherein said iron sequestering agent consists of an organic phenolic compound containing at least three free hydroxyl groups.

LEO CLARK MORGAN.
TROY J. STEWART.